United States Patent [19]

Cooper, Jr. et al.

[11] Patent Number: 4,823,664
[45] Date of Patent: Apr. 25, 1989

[54] TANDEM SAWMILL ASSEMBLY

[76] Inventors: Hill M. Cooper, Jr.; Cooper, William B.; Robert M. Cooper, all of P.O. Box 550, Wadley, Ga. 30477

[21] Appl. No.: 73,517

[22] Filed: Jul. 15, 1987

[51] Int. Cl.⁴ .............................................. B27B 7/00
[52] U.S. Cl. ...................................... 83/367; 83/165; 83/372; 83/422; 83/420; 83/423; 83/407; 83/425.2; 83/436; 83/443; 83/708; 144/376; 144/378
[58] Field of Search .................. 144/376, 378; 83/407, 83/422, 420, 423, 425.2, 425.3, 435.2, 708, 165, 370, 372, 443, 436, 412, 367

[56] References Cited

U.S. PATENT DOCUMENTS

| | | | |
|---|---|---|---|
| 1,913,834 | 6/1933 | Dziedzic et al. | 83/423 |
| 3,220,569 | 11/1965 | Willits et al. | 83/165 |
| 3,929,048 | 12/1975 | McGehee | 83/425.2 |
| 4,210,184 | 7/1980 | McGriff | 144/378 |
| 4,262,572 | 4/1981 | Flodin | 144/376 |
| 4,270,423 | 6/1981 | Angelo | 83/425.2 |
| 4,353,276 | 10/1982 | Ackerfeldt | 83/423 |
| 4,419,914 | 12/1983 | Evans | 83/708 |
| 4,570,687 | 2/1986 | Dietz | 144/378 |
| 4,681,005 | 7/1987 | Baranski | 144/378 |

Primary Examiner—Frank T. Yost
Assistant Examiner—Scott A. Smith
Attorney, Agent, or Firm—Hurt, Richardson, Garner, Todd & Cadenhead

[57] ABSTRACT

A tandem sawmill assembly is disclosed having two linearly spaced sawing stations. A conveyor system moves the log through the first sawing station and up an inclined ramp for rotating the log ninety degrees prior to moving the log through the second sawing station. An overhead roller engages the re-oriented log and advances it to a centering platform where centering arms engage the log to orient the log axially with respect to the second sawing station. The conveyor then moves the aligned log through the second sawing station while a second overhead roller applies presssure to the upper surface of the log.

19 Claims, 7 Drawing Sheets

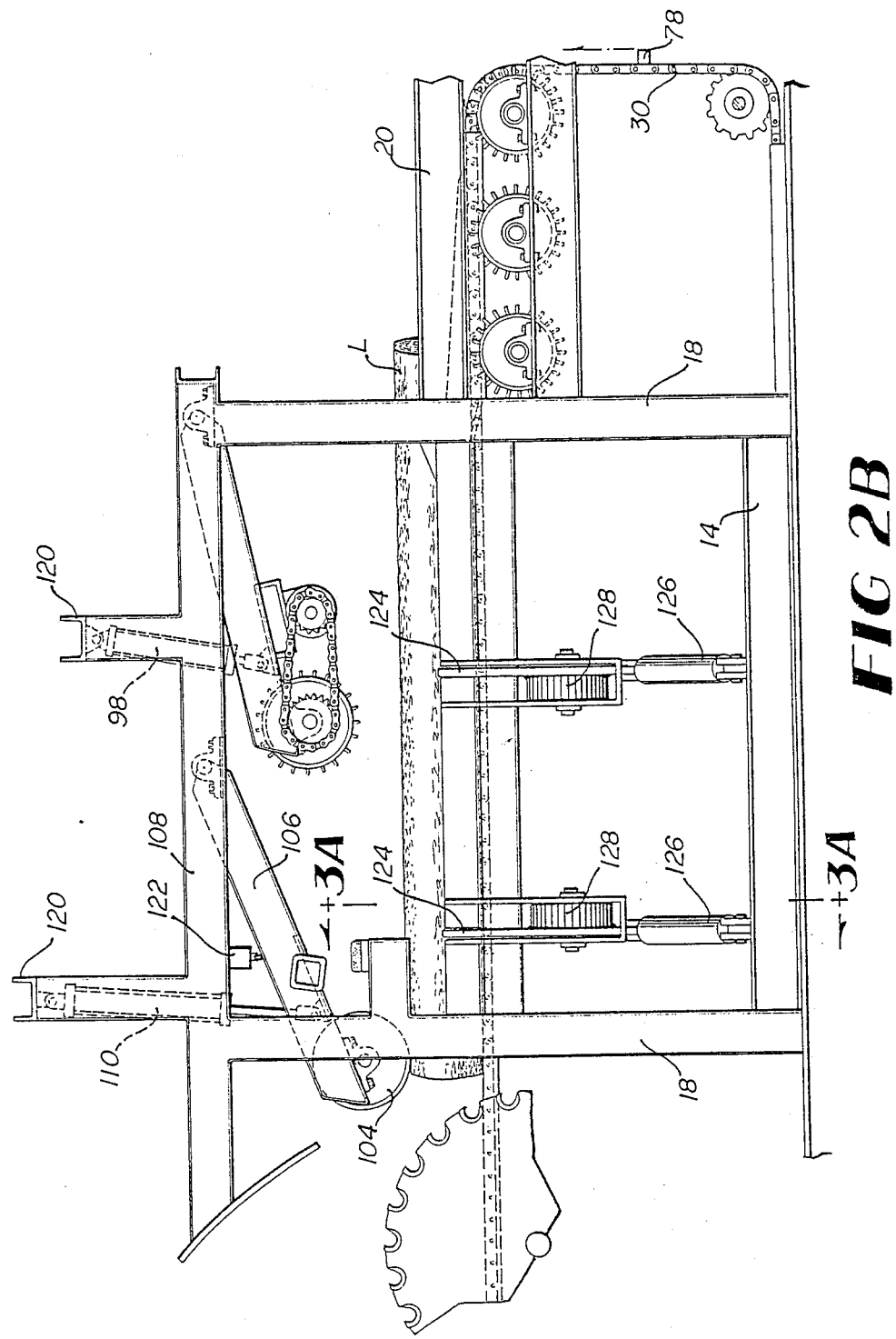

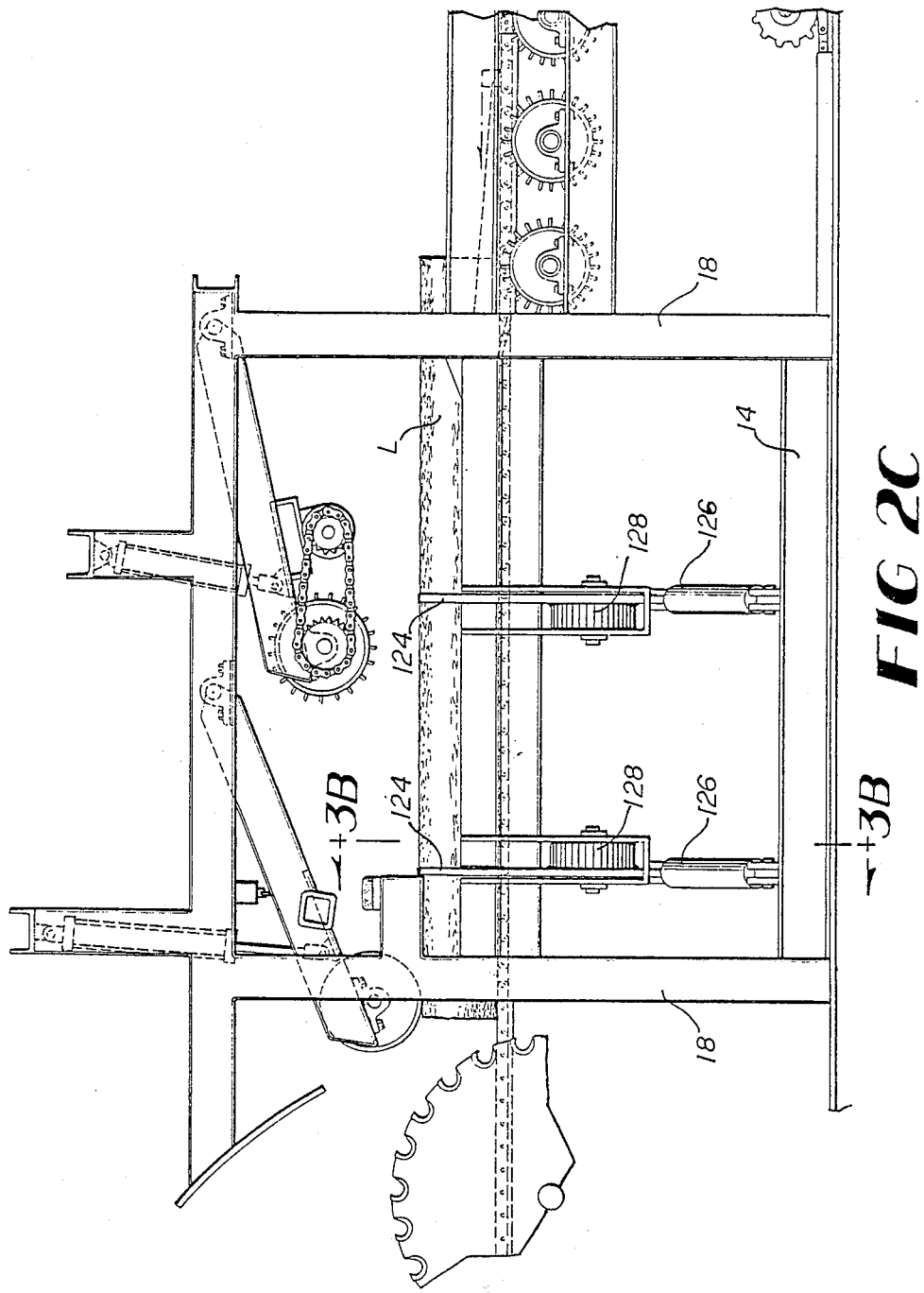

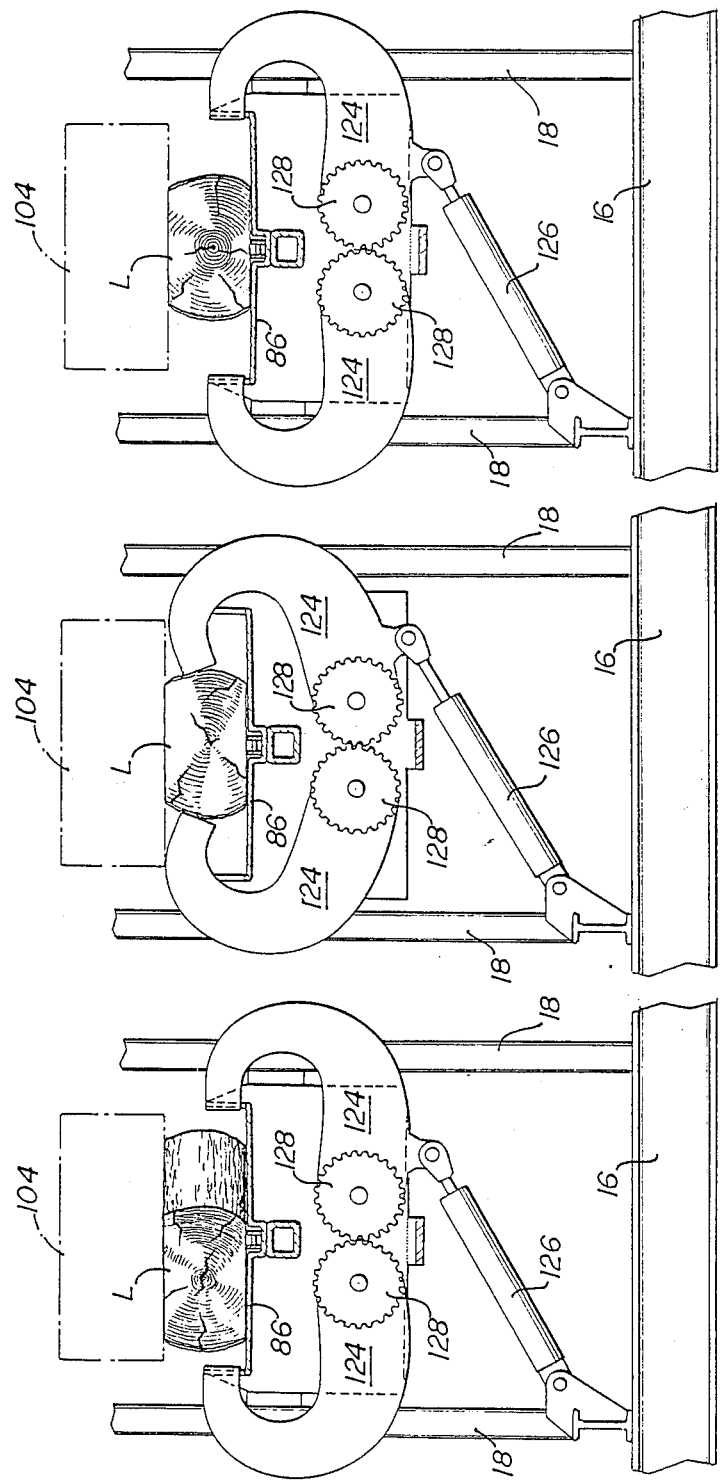

TANDEM SAWMILL ASSEMBLY

BACKGROUND OF THE INVENTION

Most of the current generation of automated or semi-automated sawmills utilize a set of spaced, parallel double saw blades which slice through the log simultaneously, either to remove the outer portions of the log or to slice the log into boards. Various means have been developed for feeding the logs through the saw blade area, for example gripping members or dogs which hold the log by each end. These dogs may also be used to rotate the log so as to locate the uncut sides in position to be cut by the saw blades. One example of this type of sawmill is found in U.S. Pat. No. 3,747,455, to Hartzell et al.

One disadvantage of this type of arrangement is that the procedure is relatively slow and may not be able to accept logs of a certain length or girth. Thus, some logs may need to be cut in half before processing or even sliced lengthwise or quartered before they can be processed. Obviously, the faster the operation can be accomplished, the more cost effective it becomes; however, the operation must also be precise enough to avoid removing excess usable lumber from the logs being cut.

Our prior patent, U.S. Pat. No. 4,287,798 for a Sawmill Work Feeding and Product Handling Apparatus used opposed, parallel supporting rollers to orient the log to a position where dogs can engage the log on opposite ends. The device provides greater flexibility in handling the log, moving the log forwardly and then rearwardly through the saw blades, again cutting the logs one at a time.

SUMMARY OF THE INVENTION

It is, therefore, one of the principal objects of the present invention to provide an improved sawmill assembly that can process logs essentially continuously, with each individual log being at a different stage of processing, and can accomplish the processing with a minimum of wasted material.

A further object of the present invention is to better stabilize the logs as they are being cut to prevent binding and/or damage to the saw blades or motors, and to accomodate logs of different widths and lengths without difficulty.

Another object of the present invention is to provide a sawmill assembly that is easy to operate and maintain and which is durable to provide a long service life.

These and additional objects are attained by the present invention which relates to an improved sawmill assembly having a rigid framework upon which is mounted a conveyor means for transporting the logs axially therealong. Additional conveying means are provided for the slabs which are sliced from the logs during the operation. At least tow sets of parallel saw blades are provided which progressively slice the rounded slabs from the outside of the log, leaving the central cant for further processing. Means are provided for rotating the log ninety degrees between the sets of saw blades and for advancing, centering and steadying the logs as they are being cut the second time. Suitable control means are provided for the single operator required, and the assembly is powered through electrical and hydraulic means.

Various additional objects and advantages of the present tandem sawmill assembly will become apparent from the following description, with reference to the accompanying drawings.

BRIEF DESCRIPTION OF THE DRAWINGS

FIG. 2B is a partial side elevational view, shown partially in cross section, of the present sawmill assembly, with the log advanced from the preceding Figure;

FIG. 2C is a partial side elevational view, shown partially in cross section, showing the log being centered during processing;

FIG. 3A is a cross sectional view showing the log centering device with the log about to be centered, the section being taken on line 3A—3A of FIG. 2B;

FIG. 3B is a cross sectional view of the log centering device having been activated to center the log, the section being taken on line 3B—3B of FIG. 2C; and FIG. 3C is a cross sectional view of the log centering device again in open position, the section being taken on line 3C—3C of FIG. 2D.

DETAILED DESCRIPTION OF THE PREFERRED EMBODIMENT

Figure 1A:
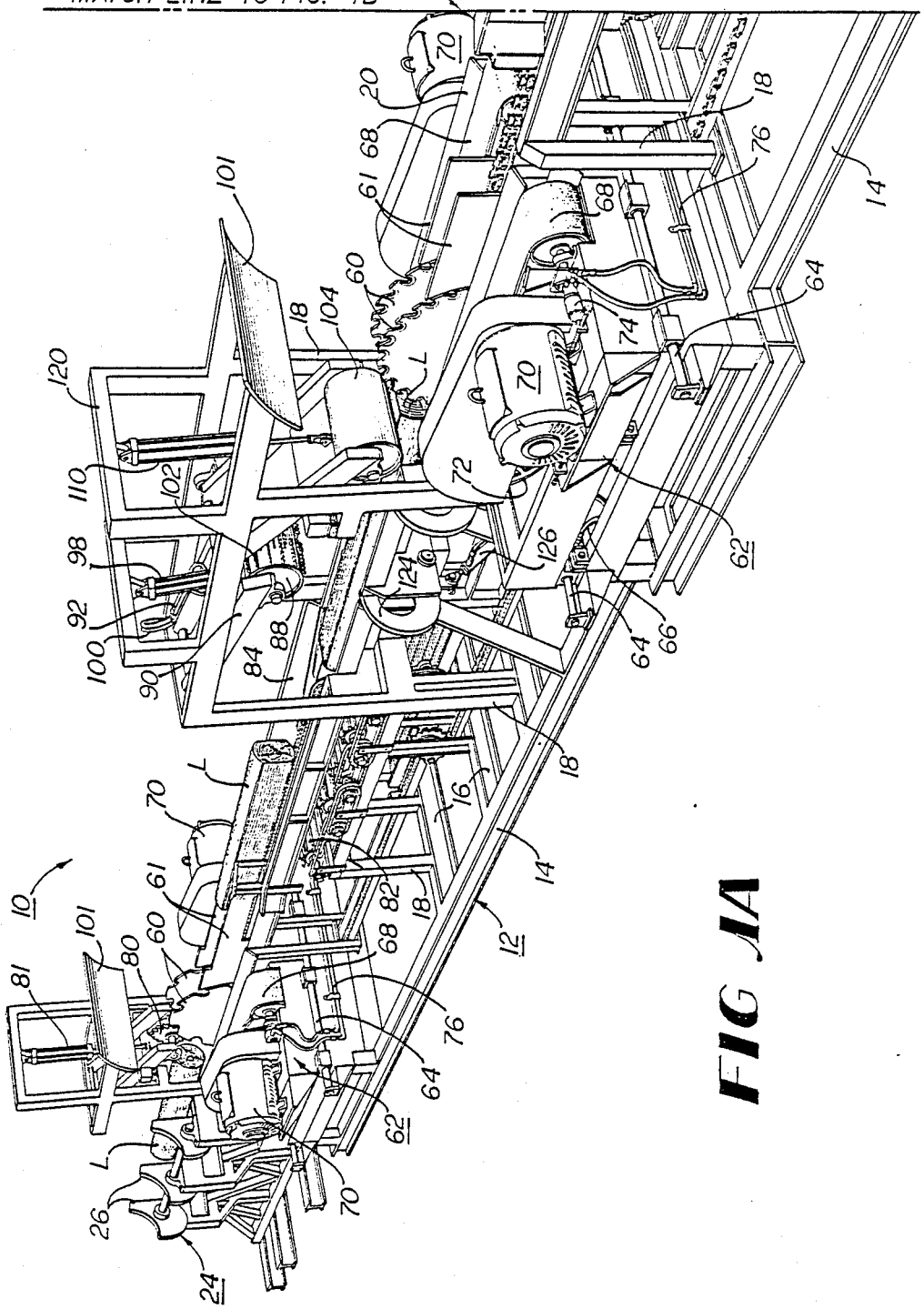
FIG. 1A is a perspective view of a portion of the present improved sawmill assembly.
Figure 1B:
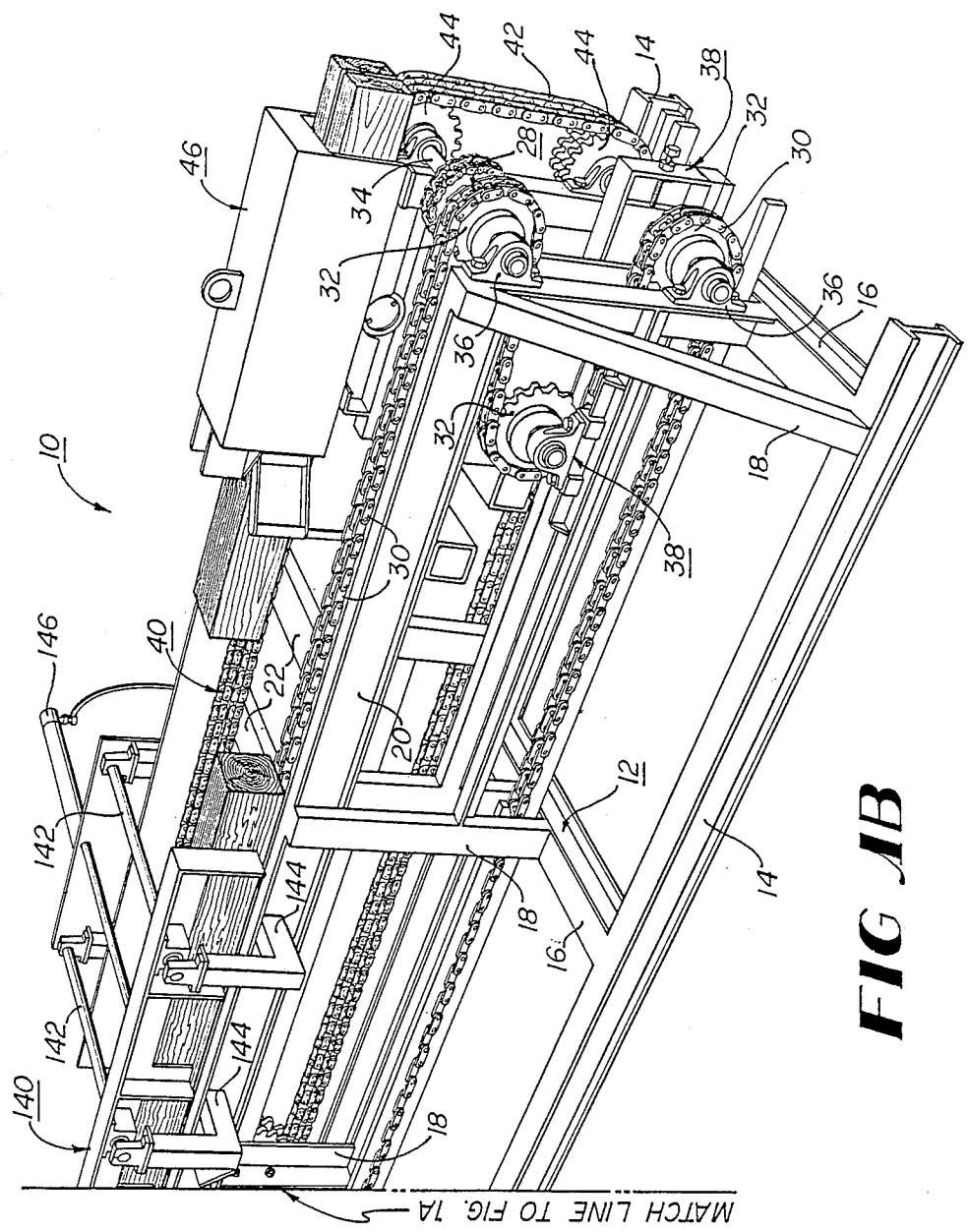
FIG. 1B is a perspective view of another portion of the sawmill assembly depicted in the previous Figure.

Referring now more specifically to the drawings, and to FIGS. 1A and 1B in particular, numeral 10 designates generally the improved sawmill assembly, shown here in a fully operational mode. The sequence of operation can most easily be explained with reference to these figures, 1A and 1B, and processing of the logs occurs from left to right, as viewed in the drawings.

This type of sawmill assembly is sometimes termed a "breakdown machine" in that its main function is to slice the outer rounded slabs off of the sides of the log, leaving a square or rectangular central cant. The log is thus "broken down", the cant being further processed into lumber by a gang saw or other device. The slabs cut from the outer perimeter may be either ground into sawdust or processed through a "chipper" to make mulch.

Thus, the present assembly includes a rigid framework 12 which is substantially open, elongated, and rectangular in shape. The framework includes a pair of spaced, longitudinally extending "I" beams 14, which are connected by a plurality of transverse "I" beams 16 to provide a base for the assembly. A plurality of generally vertical support members 18 are secured either to the longitudinal beams or the transverse beams and in general, support a raised, log conveying central track. The log conveying track is charcterized also by a pair of spaced, longitudinally extending upper "I" beams 20, which are also generally parallel to one another. Upper transverse support members 22 are connected to beams 20 where necessary to support additional platforms or work stations, such as members 22 in FIG. 1B. The functions and what particular stations are supported by these support members 22 will be described more fully hereinafter.

At the extreme left hand side, as viewed in FIG. 1A, is a station for feeding logs from a laterally extending conveyor, (not shown) to a gate means 24, which includes a plurality of pivotally mounted gate members 26. The operator utilizes the gate means to feed, one at a time, logs L to the conveying track of the present sawmill assembly.

Extending the length of the present assembly, substantially in the center thereof, is a variable speed conveyor means 28 which includes endless flexible elements such as chains 30. These central chains are disposed on sprockets 32 which are in turn mounted on shafts 34 for rotation in suitable pillow block bearings 36 or the like. The conveyor means includes a suitable tensioning mechanism such as that designated by numeral 38 in FIG. 1B, which is used to adjust and maintain the proper tension on the chains. In general, the logs are conveyed by the chain drive through the present sawmill assembly, the chain being routed, on the return run, along or near the bottom of the main frame 12 with additional chain tensioning mechanisms 38 being provided as required, based on the length of the run.

An auxiliary conveying means, designated generally by numeral 40 is provided on the downstream side of the second set of saw blades. This conveying means includes a set of chains 42, mounted on sprockets 44 which are suitably mounted forrotation. The chains 42 convey the finished central cant through a splitter 46, a gang saw (not shown) or to another suitable finishing step. The auxiliary conveyor will be explained in greater detail hereinbelow.

As shown in FIGS. 1A and 1B, the invention includes a double set of linearly spaced cutting stations to break down the logs into square or rectangular central cants. In both cutting stations, the saw blades 60 are movable laterally in and out to pare off only the least necessary amount of wood, thereby maximizing the yield from each log. Guide means, such as plates 61 are provided on each side of the track, downstream from the saw blades, to ensure the axial alignment of the log being cut. The blade carriage assemblies 62 are mounted on transverse rods 64 with ball bushings (not shown) and the lateral movements are controlled hydraulically through lines 66 and automatic control valves (not shown), disposed beneath the carriage and connected to a suitable hydraulic pump and reservoir (not shown).

As the logs are moved through the saws, the slabs cut from the sides of the logs are directed to spaced, parallel, continuous conveyors 68 which transport the slabs to a suitable trough or bin where they may be collected for further processing. As can be seen in FIGS. 1A and 1B, each blade carriage assembly has two motors 70 which are electrically operated and run sheaves 72 which are in turn connected through couplings (not shown) to the blades. The slab conveyors 68 are hydraulically operated, with motors 74 connected to the conveyors and to hyraulic lines 76, the lines 76 being supplied from the same reservoir and pump as is used for jogging the blade carriages.

Referring still to FIGS. 1A and 1B, it is seen that as many as five logs may be processed simultaneously, with the processing occurring essentially continuously, that is, as soon as a log has passed through the first set of saw blades, another can be loaded from the gate means 24 to the main conveying track. The chains 30 of the conveyor are provided with radially extending abutment means or lugs 78, shown in FIGS. 2A through 2D. The lugs are movable from one link to another on the chain and the processing operation is set up on a timed schedule to facilitate the continuous flow desired, by mounting the lugs a certain defined distance apart depending on conditions such as the length and type of log being processed.

As a log is released to the conveyor from gate means 24, the operator adjusts the spacing of the blades, and a lug pushes the log through the first cutting station. This station has, in addition to blades 60, a toothed pressure roller 80 which holds the log down with a hydraulic piston and cylinder 81 and helps to ensure a smooth cut. A guard 101 is provided as a shield against wood chips dislodged during the cutting operation. As the log passes through the first set of saws, slabs are trimmed from each side and deposited on conveyors 68 which transport the slabs away from the operations area.

The log is propelled forwardly by the lug 78 in the chain 30 and by rollers 82 to an inclined and inwardly sloping ramp 84. The log rides up the ramp and as it rolls off on the uncut, rounded side, is caused to rotate ninety degrees to rest on one of the now flattened sides. The log is then further propelled by rollers 82 to the position shown in FIG. 2A.

At this point, the log is engaged by an upper log engaging and propelling means, such as overhead roller 88. Roller 88 is mounted on an arm 90 which is pivotally attached to upright 18. The roller is driven by a hydraulic motor 92 which drives rotor 94. The rotor in turn drives roller 88 through a chain 96 or similar arrangement. The elevation of arm 90 is in part controlled by the height of the log, and in part by a hydraulic cylinder 98, both the cylinder and motor 92 being supplied with hydraulic fluid through lines 100.

Roller 88 has radially extending projections such as spikes 102 which engage the log and propel it forward to the position shown in FIG. 2B. As shown, the front end of the log is pushed under a smooth surfaced pressure roller 104. This roller 104 is mounted on arm 106 which is pivotally attached to a croww beam 108, extending between uprights 18. Pressure on the arm and roller 104 is maintained by a hydraulic cylinder 110, cylinders 110 and 98 being mounted on transverse frame members 120.

As roller 104 is lifted by the end of the log, the arm 106 trips a limit switch 122 which activates cylinder 98 to raise the arm 90 and its spiked roller 88. Here, FIGS. 2B and 3A show the same positioning of the equipment. With the log now esting on platform 86, a dual set of centering arms 124 are activated through hydraulic cylinders 126 as shown in FIGS. 2C and 3B. The centering arms are connected at their base by rotatably mounted and meshed gears 128 which move the opposed arms simultaneously to center the log. The log at this point is still being held by roller 104 at its lead end, thus contact with the log is being made at five points, the roller and the four arms, making the centering operation both quick and precise. Having cnetered the log, the arms 124 are returned to their open position by cylinders 126, shown in FIG. 3C. During this time, the operator can also set the spacing of the second set of saw blades by jogging the blade carriage.

Figure 2A:
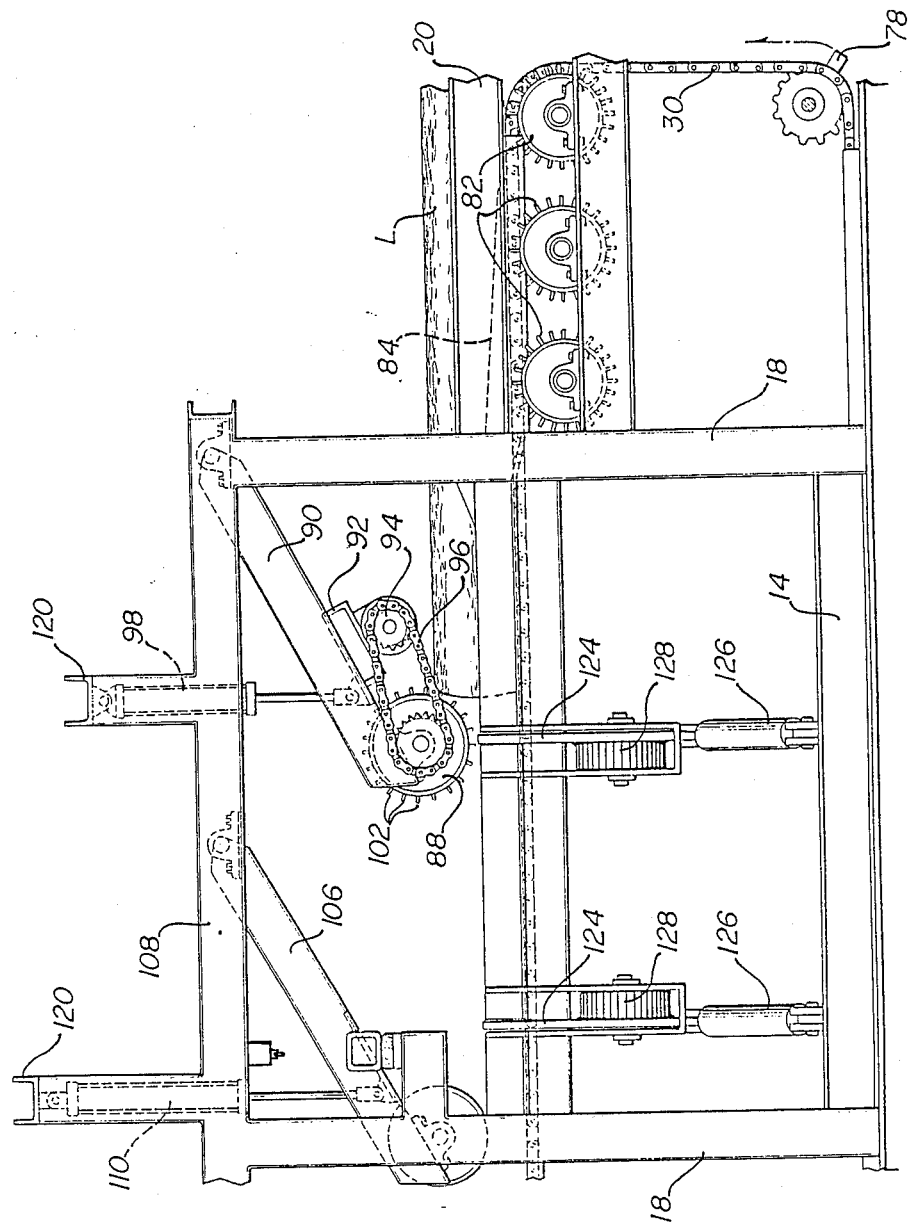
FIG. 2A is a partial side elevational view, shown partially in cross section, of a log being processed through the present sawmill assembly.
Figure 2D:
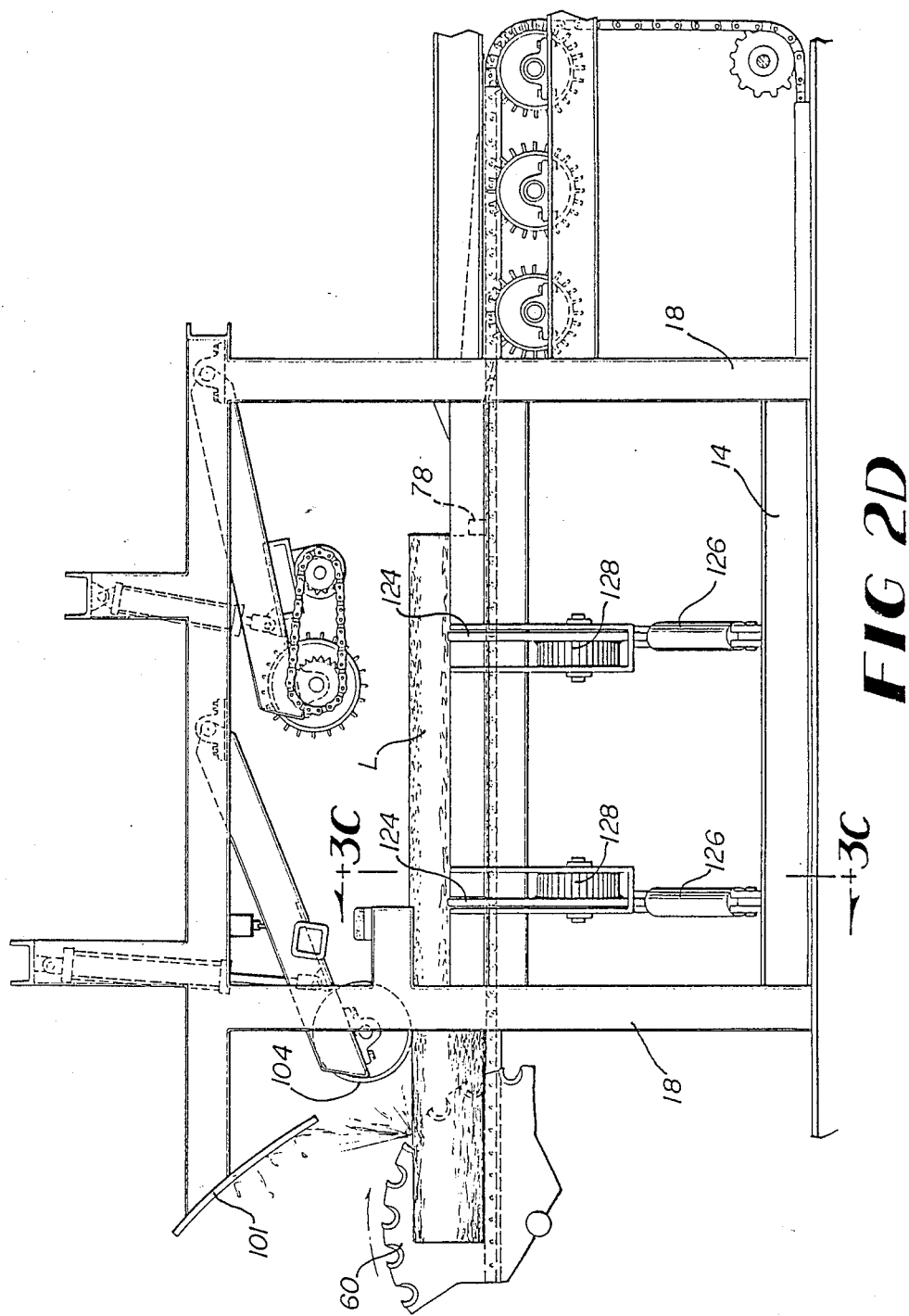
FIG. 2D is a partial, side elevational view, shown partially in cross section, of the sawmill assembly with the log being further advanced.

As the centering operation proceeds, and proceeding in sequence from FIGS. 2A through 2D, lug 78 on chain 30 can be seen advanced toward the log, having been timed and set in a desired position, depending on the approximate length of the logs being cut. The lug reaches the centered log in virtual sequence with the retraction of the centering arms. The log is then propelled through the second set of saw blades, as shown in FIG. 2D, pressure being maintained on the log by roller 104. This provides a squared or rectangular central cant, suitable for processing into lumber. As with the first set of saw blades, a guard 101 is provided, mounted to frame member 108, to deflect chips dislodged during the sawing operation. The remaining two slabs cut from the sides of the log are deflected and conveyed by the side conveyor belts 68 to a waiting trough or bin beneath the frame.

Returning to FIGS. 1A and 1B, the squared or rectangular central cant is conveyed on chain 30 either directly off of the sawmill assembly or to an auxiliary splitter or gang saw. The operator controls this further procesing depending on the sizes desired. An elongated bar means 140 is provided downstream from the second set of saw blades. The bar is slidably mounted and laterally movable on rods 142 which are supported by struts 144 connected to beam 20. Hydraulic actuator 146 controls the lateral movement of the bar, which is selectively operated to move the cant to conveyor 40.

The present assembly thus provides essentially continuous processing of logs. The operation can be run by a single operator and the various advantages over sawmills which can only process a single log at a time are believed to be evident. The use and operation of the present tandem sawmill assembly have been fully described in conjunction with the description of the structural features. The invention is capable of processing eight to ten foot logs at a rate of approximately nine per minute, depending partly on the length of the logs being cut, thus providing a significant advantage over the prior art.

While an embodiment of a tandem sawmill assembly has been shown and described in detail herein, various changes and modifications may be made without departing from the scope of the present invention.

We claim:

1. A tandem sawmill assembly comprising a main frame assembly including base members and spaced parallel frame members mounted at an elevation above said base and defining a generally central track, conveying means disposed between said frame members and adapted for moving logs axially therealong, a first set of motor-driven saw means having spaced parallel blades for cutting two sides from a log as the log is moved therebetween, means disposed downstream from said first saw means for rotating the log ninety degrees to rest on one of said cut sides, an overhead conveying means including a roller means having log engaging projections extending around the circumference thereof connected to said frame members and suspended therefrom over the log for moving the log forwardly, control means for selectively activating said overhead conveying means and a second set of motor driven saw means having spaced parallel blades for cutting the remaining two sides from the log as the log is moved therebetween by said conveyor means.

2. A sawmill as defined in claim 1 in which said means for rotating the log includes an inclined, inwardly angled ramp means against which the log is pushed for causing the log to ride up the ramp and rotate ninety degrees as it rolls back down therefrom.

3. A sawmill as defined in claim 1 in which said sawmill includes a second, smooth-surfaced roller, roller support means pivotally secured to said frame for receiving said smooth-surfaced roller, said support means disposed downstream from said roller having projections thereon, and a resilient means secured to said frame for applying downward pressure on said arm means and smooth-surfaced roller for holding the log down as it is moved through said second saw means.

4. A tandem sawmill assembly comprising a main frame assembly including base members and spaced parallel frame members mounted at an elevation above said base and defining a generally central track, conveying means disposed between said frame members and adapted for moving logs axially therealong, a first set of motor-driven saw means having spaced parallel blades for cutting two sides from a log as the log is moved therebetween, means disposed downstream from said first saw means for rotating the log ninety degrees to rest on one of said cut sides, an overhead conveying means connected to said frame members and suspended therefrom over the log for moving the log forwardly, control means for selectively activating said overhead conveying means, centering means for orienting the log axially along the central track, and a second set of motor driven saw means having spaced parallel blades for cutting the remaining two sides from the log as the log is moved therebetween by said conveyor means.

5. A sawmill as defined in claim 4 in whick said means for rotating the log includes an inclined, inwardly angled ramp means against which the log is pushed for causing the log to ride up the ramp and rotate ninety degrees as it rolls back down therefrom.

6. A sawmill as defined in claim 4 in which said overhead conveying means includes arm means pivotally secured to said frame, and a roller rotatably mounted on said arm means and having projections extending radially therefrom for engaging the log.

7. A sawmill as defined in claim 6 in which said sawmill includes a second, smooth-surfaced roller, roller support means pivotally secured to said frame for receiving said smooth-surfaced roller, said support means disposed downstream from said roller having projections thereon, and a resilient means secured to said frame for applying downward pressure on said arm means and said smooth-surfaced roller for holding the log down as it is moved through said second saw means.

8. A tandem sawmil of the type having a frame with linearly spaced first and second saw means for cutting slabs from the sides of a log passed between said saw means as the log is moved along a linear path, wherein the improvement comprises a means for rotating the log ninety degrees downstream from the first of said saw means, a motor driven log propelling means connected to said frame upstream from said second saw means for engaging the log and moving it forwardly, a roller means connected to said frame for receiving the log from said propelling means and engaging the forward end of the log, a control means operatively associated with said roller means for disengaging said propelling means upon the log engaging said roller means and a centering means for orienting the log axially with respect to said second saw means prior to the log being moved therethrough whereby four sides are cut from the log as it is moved along said linear path.

9. A sawmill as defined in claim 8 in which said means for rotating the log includes an inclined, inwardly angled ramp means against which the log is pushed for causing the log to ride up the ramp and rotate ninety degrees as it rolls back down therefrom.

10. A sawmill as defined in claim 8 in which said log propelling means includes arm means pivotally secured to said frame, and a roller rotatably mounted on said arm means and having projections extending radially therefrom for engaging the log.

11. A sawmill as defined in claim 10 in which said roller means includes a second, smooth-surfaced roller, roller support means pivotally secured to said frame for receiving said smooth-surfaced roller, said support means disposed downstream from said roller having projections thereon, and a resilient means secured to said frame for applying downward pressure on said arm means and said smooth-surfaced roller for holding the log down as it is moved through said second saw means.

12. A sawmill of the type having a frame with a saw means for cutting slabs from the sides of a log as it is moved along a linear path, wherein the improvement comprises first and second linearly spaced saw means for successively cutting slabs from four sides of the log, conveying means for moving the log through said first saw means, means for rotating the log ninety degrees disposed between said first and second saw means and along the linear path of the log, log engaging means secured to said frame and suspended downwardly therefrom for engaging the upper surface of said log after said rotation has occurred, and prior to the passing of the log through said second saw means, said engaging means having a motor means for moving the log to a position upstream from said second saw means and a control means operatively associated with said log engaging means and said motor means for selectively activating said log engaging means, centering means for said log disposed upstream from said second saw means for maintaining the linear path of the log, and means for propelling the log through said second saw means for cutting slabs from the sides thereof.

13. A sawmill as defined in claim 12 in which said means for rotating the log includes an inclined, inwardly angled ramp means against which the log is pushed for causing the log to ride up the ramp and rotate ninety degrees as it rolls back down therefrom.

14. A sawmill as defined in claim 12 in which said log engaging means includes arm means pivotally secured to said frame, with a roller rotatably mounted on said arm means and having projections extending radially therefrom for engaging the log.

15. A sawmill as defined in claim 14 in which said sawmill includes a second, smooth-surfaced roller, roller support means pivotally secured to said frame for receiving said smooth-surfaced roller, said support means disposed downstream from said roller having projections thereon, and a resilient means secured to said frame for applying downward pressure on said arm means and smooth-surfaced roller for holding the log down as it is moved through said second saw means.

16. A tandem sawmill assembly for the sequential processing of generally circular logs into generally rectangular central cants, said assembly comprising an elongated framework having a base, generally vertical strut means extending upwardly from said base, and spaced generally, horizontal and parallel frame members secured to said strut means above said base for forming a log conveying track, conveying means mounted between said horizontal frame members for moving the logs along a linear path, a first set of motor-driven space, parallel saw blades for cutting two sides from a log passed therebetween, a second set of motor driven, spaced parallel saw blades for cutting the remaining two sides from a log passed therebetween, said second set being linearly spaced from said first set, means disposed between said first and second sets of saw blades for rotating the log ninety degrees, support means secured to said horizontal frame members and disposed above the log conveying track, log propelling means suspended downwardly from said support means and adapted to engage the upper surface of said log for moving said log toward said second set of saw blades, control means for selectively activating said propelling means, centered means disposed upstream from said second set of saw blades for receiving the log from said propelling means and aligning the log with said second set of saw blades, and lug means projecting radially from said conveyor means for propelling the log through said sets of saw blades.

17. A sawmill as defined in claim 16 in which said means for rotating the log includes an inclined, inwardly angled ramp means against which the log is pushed for causing the log to ride up the ramp and rotate ninety degrees as it rolls back down therefrom.

18. A sawmill as defined in claim 16 in which said log propelling means includes arm means pivotally secured to said frame, and a motor driven roller rotatably mounted on said arm means and having projections extending radially therefrom for engaging the log.

19. A sawmill as defined in claim 18 in which said sawmill includes a second, smooth-surfaced roller, roller support means pivotally secured to said frame for receiving said smooth-surfaced roller, said support means disposed downstream from said roller having projections thereon, and a resilient means secured to said frame for applying downward pressure on said arm means and smooth-surfaced roller for holding the log down as it is moved through said second saw means.

* * * * *